United States Patent
Davis et al.

[19]

[11] Patent Number: 6,118,914
[45] Date of Patent: Sep. 12, 2000

[54] METHOD AND DEVICE FOR PROVIDING STABLE AND PRECISE OPTICAL REFERENCE SIGNALS

[75] Inventors: Michael A. Davis, Alexandria, Va.; Alan D. Kersey; James R. Dunphy, both of South Glastonbury, Conn.

[73] Assignee: CiDRA Corporation, Wallingford, Conn.

[21] Appl. No.: 09/119,269

[22] Filed: Jul. 20, 1998

[51] Int. Cl.$^7$ ........................................... G02B 6/34
[52] U.S. Cl. .................. 385/37; 385/12; 385/135
[58] Field of Search ................... 385/10, 8, 122, 385/92, 37, 12, 135, 137; 359/130

[56] References Cited

U.S. PATENT DOCUMENTS

| | | | |
|---|---|---|---|
| 5,375,181 | 12/1994 | Miller et al. | 385/27 |
| 5,506,857 | 4/1996 | Meinzer | 372/55 |
| 5,563,973 | 10/1996 | Miller et al. | 385/81 |
| 5,671,307 | 9/1997 | Lauzon et al. | 385/10 |
| 5,982,582 | 4/1999 | Bao et al. | 356/345 |

FOREIGN PATENT DOCUMENTS 9827446  6/1998  WIPO .

*Primary Examiner*—Darren Schuberg
*Assistant Examiner*—Fayez Assaf

[57] ABSTRACT

A device for providing optical reference signals includes an optical fiber having a reference array formed therein, the array including at least one reference fiber Bragg grating. The array is mounted on a mounting fixture having a low coefficient of thermal expansion. The mounting fixture is in thermal contact with a thermoelectric (TE) element, and a controller controls the temperature of the TE element. A temperature sensor is in thermal contact with the mounting fixture and provides feedback to the controller to control to the temperature of the TE element to thereby maintain the temperature of the mounting fixture at a selected temperature. The other side of the temperature control element is mounting to a heat sink element. The optical fiber is attached to the mounting fixture in a configuration that minimizes any stress or strain in the optical fiber. The array includes a plurality of reference fiber Bragg gratings, and each grating is positioned in the same location on the surface of the mounting fixture. The device may be positioned in an insulating package to further enhance the temperature stability of the mounting fixture and to minimize any temperature variations or gradients in the mounting fixture.

18 Claims, 3 Drawing Sheets

METHOD AND DEVICE FOR PROVIDING STABLE AND PRECISE OPTICAL REFERENCE SIGNALS

TECHNICAL FIELD

The present invention relates to optical components, and more particularly, to the provision of one or more stable and precise optical reference signals.

BACKGROUND OF INVENTION

Fiber Bragg gratings have found wide application for both telecommunications systems and sensor systems. In both cases, it is often desirable to precisely determine the returned optical frequency from a fiber Bragg grating. For example, fiber Bragg gratings can be used to sense a variety of physical parameters such as strain, temperature, displacement and acceleration. Each fiber Bragg grating sensor device can be configured such that the parameter of interest can be directly related to the optical frequency reflected by the fiber Bragg grating sensor.

A variety of interrogation techniques have been developed to accurately and precisely determine the returned frequency from a fiber Bragg grating. Several of these interrogation techniques rely on a scanning filter approach, such as a Fabry-Perot tunable filter or an acousto-optical device. These detection schemes typically rely on the characteristics of the filter to remain constant; however, the response of such filters typically change with changes in environmental conditions such as temperature, pressure or aging of the filter. Therefore, it is necessary to use a correction or referencing method to measure and back-out any environmental effects on the filters and eliminate possible errors associated with the changing characteristics of the filter. Additionally, since the changes may not be constant across the full bandwidth or response of the filter, the referencing method should cover the entire bandwidth of the filter.

One method to characterize a filter across its entire bandwidth for changing environmental conditions is to use a fixed wavelength referencing array of stabilized fiber Bragg gratings. The array is selected to have fiber Bragg gratings with selected frequencies covering the bandwidth of the filter. The benefits of using such a referencing array include the ability to space the gratings at arbitrary distances along a single or multiple fibers or co-locating all the gratings in a single spot on a fiber. Additionally, the grating can be written to provide a custom set of reference frequencies, depending upon the application.

It is desirable to control such an array to provide a fixed (constant) response. However, since gratings are sensitive to temperature and strain, the use of gratings as a reference requires precise control of the environmental conditions of the array. The strain response of a fiber Bragg grating is given by the following equation:

$$\Delta\lambda = (0.78) \times \lambda_R \times \Delta\epsilon$$

Where $\lambda_R$ is the reference wavelength of the fiber Bragg grating in an unstrained condition and $\Delta\epsilon$ is the change in strain in the grating. The temperature response of the fiber Bragg grating is given by the following equation:

$$\Delta\lambda = (7 \ast 10^{-6}) \times \lambda_R \times \Delta T$$

Where $\Delta T$ is the change in temperature of the grating.

One method of providing reference optical signals is to provide passive temperature compensation for a reference array of fiber Bragg gratings. For example, U.S. Pat. No. 5,757,540 to Judkins, et al. discloses the packaging of a fiber grating in a single material such that a temperature-induced shift in the reference frequency is compensated by a corresponding strain-induced shift arising from the packaging material. Similarly, International Patent Application WO 98/27446 to Miller discloses temperature compensated fiber Bragg gratings wherein the fiber Bragg gratings are mounted on a structure that comprises two plates made of materials having dissimilar temperature coefficients of expansion and bonded together. The structure bends with changes in temperature to cause a strain in the fiber that compensates for temperature induced wavelength shifts.

The forgoing methods of passive temperature compensation are sufficient where highly stable and precise optical reference signals are not necessary. However, such passive temperature compensation methods are not suitable for certain applications, such as sensor applications, where precise and stable optical reference signals are necessary. There therefore exists a need for a method and apparatus for providing one or more stable and precise optical reference signals.

SUMMARY OF THE INVENTION

An object of the present invention is to provide stable and precise optical reference signals.

Another object of the present invention is to provide such optical reference signals using a stabilized array of fiber Bragg gratings having a combination of active and passive temperature and strain stabilization.

Another object of the invention is to provide such optical reference signals that are accurate to 1 picometer (pm).

According to the present invention, a device for providing optical reference signals includes an optical fiber having a reference array formed therein, the array including at least one reference fiber Bragg grating. The array is mounted on a mounting fixture having a low coefficient of thermal expansion. The mounting fixture is in thermal contact with a temperature control element, and a controller controls the power supplied to the temperature control element. A temperature sensor is in thermal contact with the mounting fixture and provides feedback to the controller to control to the power supplied to the control element to thereby maintain the temperature of the mounting fixture at a selected temperature. The other side of the temperature control element is mounting to a heat sink element.

In further accord with the present invention, the optical fiber is attached to the mounting fixture in a configuration that minimizes any stress or strain in the optical fiber. In still further accord with the present invention, the array includes a plurality of reference fiber Bragg gratings, and each grating is positioned in the same location on the surface of the mounting fixture.

According further to the present invention, the device is positioned in an insulating package to further enhance the temperature stability of the mounting fixture and to minimize any temperature variations or gradients in the mounting fixture.

The present invention provides a significant improvement over the prior art by providing a fiber Bragg grating array that is stable with respect to temperature and strain such that the array can be use to provide stable and precise optical reference signals. The arrangement of the invention prevents the fiber Bragg grating array from being exposed to temperature variations of greater that 0.09° C. and strain variations of greater than 0.8 µstrain, such that each fiber Bragg grating provides a wavelength reference that is accurate to 1 pm.

The foregoing and other objects, features and advantages of the present invention will become more apparent in light of the following detailed description of exemplary embodiments thereof, as illustrated in the accompanying drawings.

DETAILED DESCRIPTION OF THE INVENTION

Figure 1:
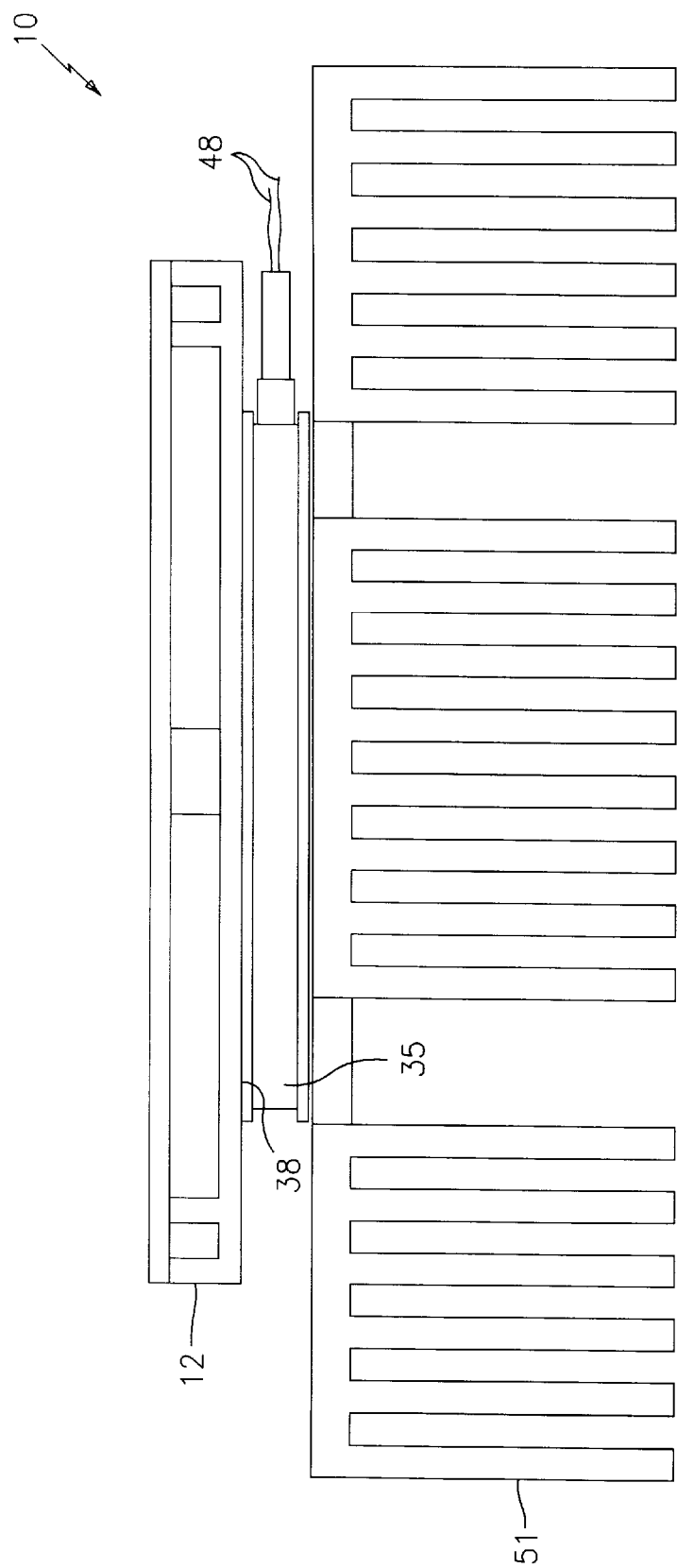
FIG. 1 is a side view of a device for providing optical reference signals in accordance with the present invention.
Figure 2:
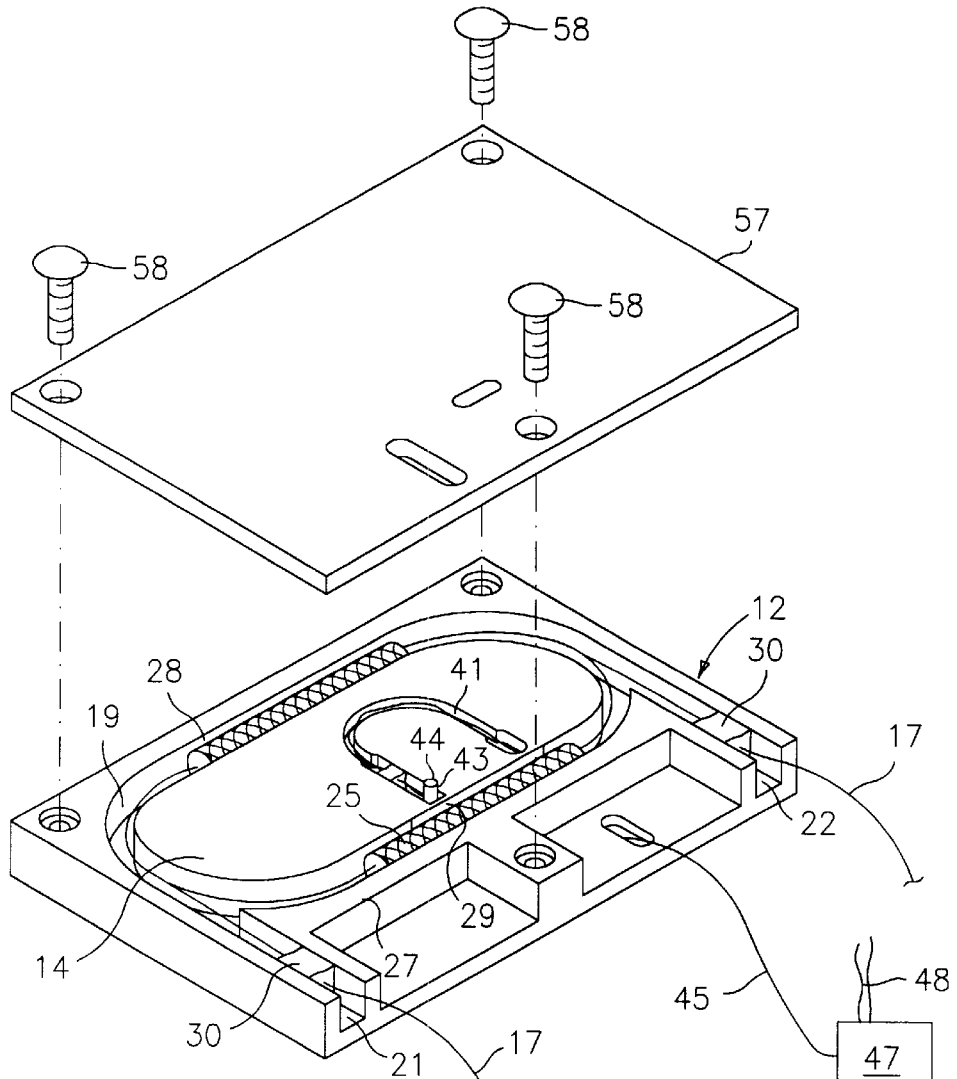
FIG. 2 is an exploded perspective view of a mounting fixture of the device of FIG. 1.

Referring to FIGS. 1 and 2, a device 10 for providing stable and precise optical reference signals includes a combination of passive strain compensation and active temperature control. The device 10 includes a mounting fixture 12 having a mounting surface 14 for mounting an optical fiber 17. The mounting surface 14 has a channel 19 formed therein for receiving the optical fiber 17. The channel 19 has a generally oval or racetrack configuration with an entrance channel 21 and an exit channel 22 where the optical fiber 17 enters and exits the mounting fixture 12. The optical fiber 17 enters at the entrance channel 21 and is looped around the channel 19 one or more times. The optical fiber 17 then exits the mounting fixture 12 at the exit channel 22.

At least one fiber Bragg grating 25 is formed in the length of optical fiber 17 in the channel 19. The optical fiber 17 is mounted in the mounting fixture 12 such that the length of optical fiber 17 containing the fiber Bragg grating 25 is positioned in one of the straight sections 27, 28 of the channel 19. The purpose of positioning the fiber Bragg grating 25 in the straight section 27,28 is to eliminate any bending effects on the fiber Bragg grating 25. The optical fiber 17 is then anchored at the entrance channel 21 and exit channel 22 using a high strength adhesive material 30, such as an epoxy, to prevent any external strain on the fiber from influencing the stabilized fiber Bragg grating 25. Once the optical fiber 17 is mounted in the fixture, the entire fixture and optical fiber are annealed at a sufficient temperature to soften and remove strain in the fiber coating. This temperature treatment will remove any stresses and strains caused by coiling of the optical fiber 17 in the channel 19, which could otherwise change the strain in the fiber Bragg grating 25 as the fiber relaxes over time. Additionally, a thermally conductive material 29, such as a thermal grease, is received in the channel 19 in the area of the fiber Bragg grating 25. Such a material provides significant advantages, including: minimizing the friction between the lengths of fiber 17 in the channel 19 and between the fiber 17 and the channel 19, and ensuring good thermal contact between the fiber 17 and the mounting fixture 12.

The mounting fixture 12 is made of a material having a low coefficient of thermal expansion (CTE) over the range of temperature the device 10 is intended to operate. For example, the mounting fixture 12 may be made of INVAR. The low CTE material will provide passive strain compensation to minimize any strain in the fiber caused by changes in temperature of the mounting fixture 12. The channel 19, including the entrance and exit channels 21, 22, may be machined in the mounting fixture 12. Alternatively, any other suitable method of forming a channel in a low CTE material, such as die casting, etching, etc., may be used to form the mounting fixture 12 of the invention.

Figure 3:
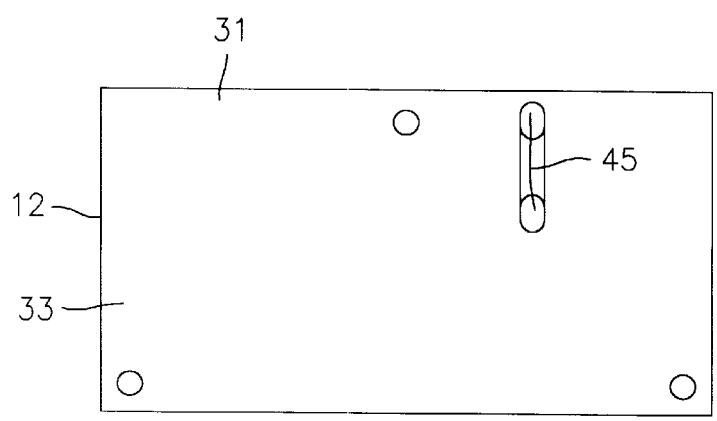
FIG. 3 is a bottom view of the mounting fixture of FIG. 2.

Referring also to FIG. 3, the side 31 of the mounting fixture 12 opposite the mounting surface 14 has a smooth attachment surface 33 for attaching a thermo-electric (TE) element 35, such as a Peltier element, which can heat or cool on either side of the element 35, depending upon the application of power to the element 35. The TE element 35 is attached to the attachment surface 33 using a thermally conductive adhesive material 38, such as a thermally conductive epoxy adhesive. Alternatively, as described in greater detail herein, the element 35 may be mechanically attached to the attachment surface 33. In this case, a thermally conductive material, such as thermal grease or other thermally conductive material, may be positioned between the attachment surface 33 and the element 35 to provide a high degree of heat transfer therebetween.

Referring to FIGS. 2 and 3, a channel 41 is formed in the mounting surface 14 for receiving a temperature sensor 43. The temperature sensor 43 may be surrounded by a thermally conductive material 44, such as thermal grease, or may be attached in the channel 41 using a thermally conductive adhesive, such as epoxy. The temperature sensor 43 is interconnected via lines 45 to a temperature controller 47 that controls the power applied to the TE element 35 via power lines 48. The controller 47 controls the power applied to the TE element 35 to maintain the mounting fixture 12 at a selected temperature, such as 35° C., as detected by the temperature sensor 43. The combination of the temperature controller 47, temperature sensor 43 and TE element 35 has been demonstrated to provide temperature control better than 0.001° C., which stabilizes a fiber Bragg grating 35 mounted on the mounting surface 14 to better than 0.02 pm.

Referring again to FIG. 1, the other side of the TE element 35 is mounted to a heat sink element 51. The heat sink element 51 provides for heat transfer from the TE element 35 during heating or cooling of the mounting fixture 12. The heat sink element 51 may be of a suitable type know in the art for providing good thermal conductivity, such as an aluminum heat sink formed to have a large surface area for heat transfer. The TE element 35 may be mounted to the heat sink element 51 using a thermally conductive adhesive, such as epoxy. Alternatively, as described herein, the TE element 35 may be mechanically attached to the heat sink element 51, in which case a thermally conductive material, such as thermal grease, may be positioned therebetween to enhance heat transfer.

The device described thus far provides excellent temperature and strain control of the optical fiber 17 and fiber Bragg grating 25, such that a stable and precise optical reference signal may be provided by the fiber Bragg grating 25. If more than one optical reference signal is desired, multiple fiber Bragg gratings 25 may be formed in the optical fiber 17. In this case, the gratings 25 may be co-located at a specific location in the fiber, with the location positioned in the straight section 27, 28 of the channel 19. Alternatively, multiple gratings 25 may be formed along the length of the optical fiber 17, with the spacing between the gratings 25 selected such that when the fiber 17 is wrapped in the channel 19, all of the gratings are positioned in an identical location in the straight section 27, 28 of the channel 19. Multiple optical reference signals may also be provided by forming a sampled fiber Bragg grating 25 in the fiber with the sampled fiber Bragg grating 25 positioned in the straight section 27, 28 of the channel 19.

Referring again to FIG. 2, a cover 57 may be received over the mounting surface 14 to retain the optical fiber 17 in the channel 19 and to retain the temperature sensor 43 in the channel 41. The cover may be attached to the mounting surface 14 via fasteners 58, or any other suitable attachment means. The cover 57 provides additional temperature stability by providing a volume of air that does not exchange with the outside environment and therefore is maintained at a generally constant temperature relating to the temperature of the mounting fixture 14.

Figure 4:
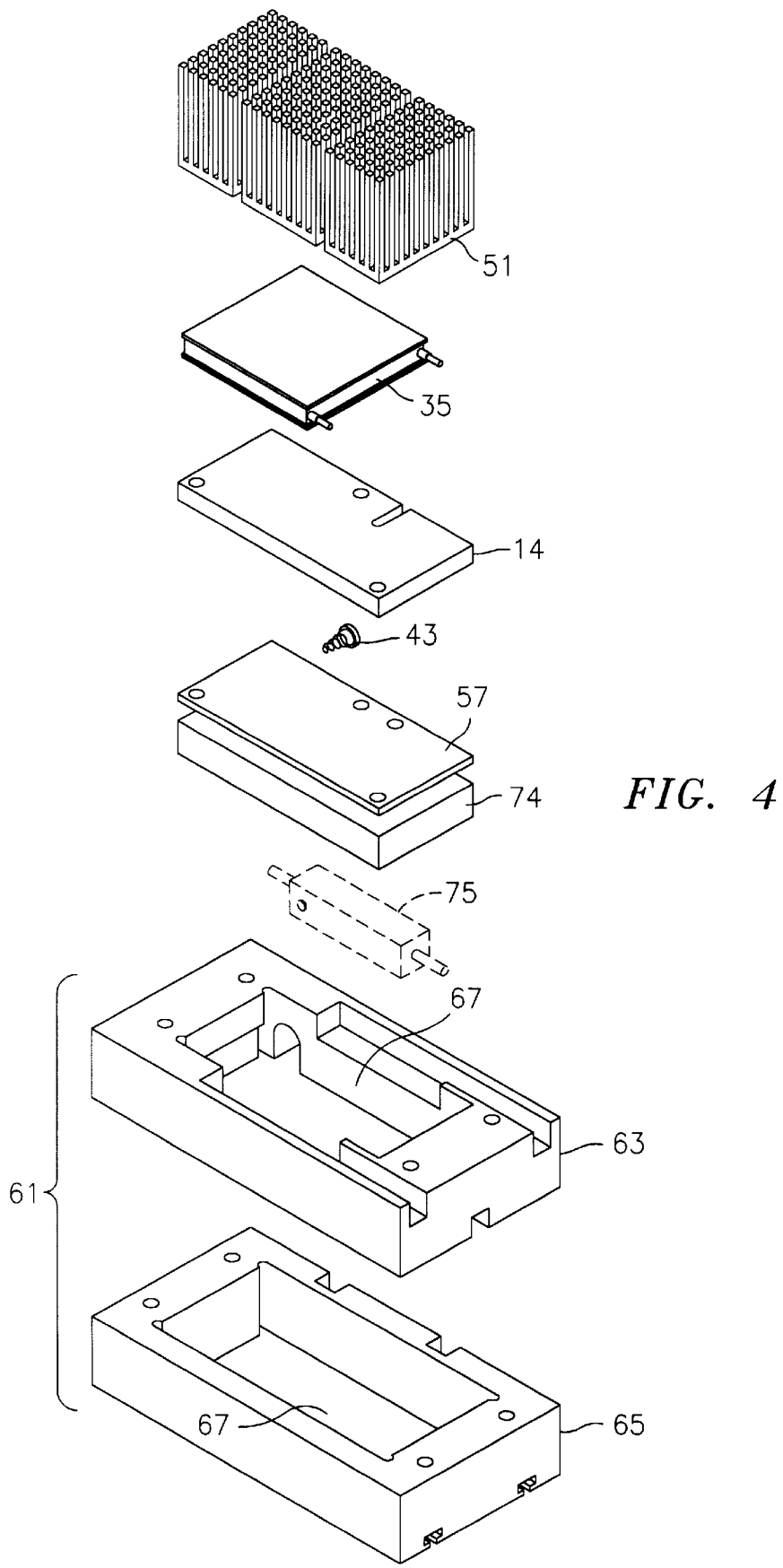
FIG. 4 is an exploded perspective view of the device of FIG. 1, with a Fabry-Perot tunable filter shown in phantom.

Referring to FIG. 4, to provide even further temperature stability, the device 10 may include an insulating enclosure 61. The enclosure 61 is made of an insulating material, such as polycarbonate with all of the void spaces within the enclosure filled with additional insulating material, such as rigid polyvinylchloride (PVC) foam. The enclosure 61 may also serve for the mechanical attachment of the various components of the device 10. As illustrated in FIG. 4, the enclosure 61 is provided in two sections 63, 65. The heat sink element 51 may be secured to one of the enclosure sections 63 by threaded fasteners, or by another suitable fastening method such as high strength adhesive. The heat sink element 51 is arranged for thermal exchange with the environment outside of the enclosure 61. The TE element 35 is then positioned within a recess 67 of the sections 63, 65 against the heat sink element 51. As discussed above, a thermally conductive material such as thermal grease may be placed between the TE element 35 and the heat sink element 51. The mounting fixture 14 is then placed against the TE element 35 with thermally conductive material therebetween. Any void spaces in the recess 67 may be filled with insulation material. Additional insulation material is received over the cover 57 of the mounting fixture 14 and then the two sections 63, 65 of the enclosure 61 are attached together using threaded fasteners or other suitable attachment means. Sufficient insulation material 74 is received within the recess 67 of the enclosure 61 to securely hold all of the components of the device 10 in place.

Another significant advantage of the invention is that if the fiber Bragg grating array 25 is used to provide optical reference signals for a Fabry-Perot tunable filter, then the Fabry-Perot tunable filter may be received within the void space of the enclosure 61 to provide a stable temperature environment for the tunable filter. For example, a Fabry-Perot tunable filter 75 is shown in phantom in FIG. 4 received within the enclosure 61.

Although the invention has been described and illustrated with respect to exemplary embodiments thereof, the foregoing and various other additions and omissions may be made therein and thereto without departing from the spirit and scope of the present invention.

We claim:

1. A device for providing optical reference signals, comprising:
   an optical fiber having a reference array formed therein, the array including a plurality of reference fiber Bragg gratings, each for providing a reference optical signal;
   a mounting fixture having a low coefficient of thermal expansion, a portion of said optical fiber containing said reference array being mounted on said mounting fixture such that each of said fiber Bragg gratings is positioned at approximately the same location on said mounting fixture;
   a temperature control element having a surface in thermal contact with said mounting fixture, said temperature control element maintaining said mounting fixture at a selected temperature; and
   a heat sink element in thermal contact with a second surface of said temperature control element.

2. A device according to claim 1, further comprising an insulating enclosure, said mounting fixture and said temperature control element being received within a recess of said enclosure, and said heat sink element being arranged for thermal exchange with the environment outside of said enclosure.

3. A device according to claim 1, further comprising:
   a temperature sensor in thermal contact with said mounting fixture for providing a temperature signal indicative of the temperature of said mounting fixture; and
   a controller responsive to said temperature signal for controlling said temperature control element to maintain said mounting fixture at a selected temperature.

4. A device according to claim 3, wherein said temperature control element is a thermo-electric element.

5. A device according to claim 1, wherein said mounting fixture includes a mounting surface, said mounting surface having a channel formed therein for receiving said optical fiber, said mounting fixture further including an attachment surface opposite said mounting surface for thermal contact with said temperature control element.

6. A device according to claim 5, wherein said channel is configured such that said section of fiber containing said array is positioned in a straight section of said channel to prevent said section of fiber from being exposed to bending stresses.

7. A device according to claim 6, further comprising a cover for covering said mounting surface.

8. A device according to claim 6, further comprising an insulating enclosure, said mounting fixture and said temperature control element being received within a recess of said enclosure, and said heat sink element being arranged for thermal exchange with the environment outside of said enclosure.

9. A device according to claim 6, wherein all of said fiber Bragg gratings are spaced along said optical fiber such that when said optical fiber is received in said channel, all of said fiber Bragg gratings are positioned at approximately the same location within said straight section of said channel.

10. A device according to claim 6, wherein said plurality of fiber Bragg gratings are written in a single location within said optical fiber.

11. A device according to claim 6, further comprising:
    a temperature sensor received in a temperature sensor channel in said mounting surface, said temperature sensor being positioned in thermal contact with said mounting fixture for providing a temperature signal indicative of the temperature of said mounting fixture; and
    a controller responsive to said temperature signal for controlling said temperature control element to maintain said mounting fixture at a selected temperature.

12. A device according to claim 11, wherein said temperature control element is a thermo-electric element.

13. A device according to claim 12, further comprising a cover for covering said mounting surface.

14. A device according to claim 13, further comprising an insulating enclosure, said mounting fixture and said temperature control element being received within a recess of said enclosure, and said heat sink element being arranged for thermal exchange with the environment outside of said enclosure.

15. A device according to claim 13, wherein all of said fiber Bragg gratings are spaced along said optical fiber such that when said optical fiber is received in said channel, all of said fiber Bragg gratings are positioned at approximately the same location within said straight section of said channel.

16. A device according to claim 15, further comprising an insulating enclosure, said mounting fixture and said temperature control element being received within a recess of said enclosure, and said heat sink element being arranged for thermal exchange with the environment outside of said enclosure.

17. A device according to claim 13, wherein said plurality of fiber Bragg gratings are written in a single location within said optical fiber.

18. A device according to claim 17, further comprising an insulating enclosure, said mounting fixture and said temperature control element being received within a recess of said enclosure, and said heat sink element being arranged for thermal exchange with the environment outside of said enclosure.

\* \* \* \* \*